(12) United States Patent
Canini

(10) Patent No.: US 11,196,311 B2
(45) Date of Patent: Dec. 7, 2021

(54) ELECTRIC GENERATOR HAVING MULTIPLE ELECTRICAL MACHINES

(71) Applicant: DDIS, Anzin (FR)

(72) Inventor: Jean-Marc Canini, Aibes (FR)

(73) Assignee: DDIS, Anzin (FR)

( * ) Notice: Subject to any disclaimer, the term of this patent is extended or adjusted under 35 U.S.C. 154(b) by 0 days.

(21) Appl. No.: 17/124,022

(22) Filed: Dec. 16, 2020

(65) Prior Publication Data

US 2021/0104928 A1 Apr. 8, 2021

Related U.S. Application Data

(63) Continuation of application No. 16/996,568, filed on Aug. 18, 2020, now abandoned, which is a (Continued)

(30) Foreign Application Priority Data

Oct. 1, 2012 (FR) ....................................... 1259253

(51) Int. Cl.
*H02K 1/30* (2006.01)
*F03D 80/60* (2016.01)
(Continued)

(52) U.S. Cl.
CPC ................ *H02K 1/30* (2013.01); *F03D 3/00* (2013.01); *F03D 9/25* (2016.05); *F03D 80/60* (2016.05);
(Continued)

(58) Field of Classification Search
CPC .......... H02K 1/30; H02K 1/148; H02K 7/183; H02K 2213/12; H02K 1/2793;
(Continued)

(56) References Cited

U.S. PATENT DOCUMENTS 5,844,341 A 12/1998 Spooner et al.
6,002,193 A * 12/1999 Canini ..................... H02K 3/46
310/101
(Continued)

FOREIGN PATENT DOCUMENTS

FR 2926935 A1 7/2009
WO 99/48187 A1 9/1999

OTHER PUBLICATIONS

Eduard Muljadi et al., "Axial-Flux Modular Permanent-Magnet Generator with a Toroidal Winding for Wind-Turbine Applications", IEEE Transactions on Industry Applications, vol. 35, No. 4, Jul./Aug. 1999, pp. 831-836.

*Primary Examiner* — Charles Reid, Jr.
(74) *Attorney, Agent, or Firm* — MH2 Technology Law Group, LLP

(57) ABSTRACT

An electric generator that converts mechanical energy to electrical energy includes, among other things, a first axial flow electrical machine that includes a first rotor mounted in rotation about a first axis and surrounding a first stator; a second axial flow electrical machine that includes a second rotor coaxial to the first rotor and surrounding a second stator; and first azimuthal securing means that joins together the first and second rotors so that the first and second rotors can be simultaneously set in rotation about the first axis. The electrical generator may be used as part of a wind turbine.

12 Claims, 7 Drawing Sheets

Related U.S. Application Data continuation of application No. 16/524,218, filed on Jul. 29, 2019, now abandoned, which is a continuation of application No. 16/134,160, filed on Sep. 18, 2018, now abandoned, which is a continuation of application No. 15/787,190, filed on Oct. 18, 2017, now abandoned, which is a continuation of application No. 14/432,491, filed as application No. PCT/FR2013/052120 on Sep. 17, 2013, now abandoned.

(51) Int. Cl.

| | | |
|---|---|---|
| *F03D 9/25* | (2016.01) | |
| *H02K 1/14* | (2006.01) | |
| *H02K 1/18* | (2006.01) | |
| *H02K 1/28* | (2006.01) | |
| *H02K 7/18* | (2006.01) | |
| *F03D 3/00* | (2006.01) | |
| *H02K 1/27* | (2006.01) | |
| *F03D 80/70* | (2016.01) | |
| *F03D 13/20* | (2016.01) | |

(52) U.S. Cl.
CPC ............ *H02K 1/148* (2013.01); *H02K 1/182* (2013.01); *H02K 1/2793* (2013.01); *H02K 1/28* (2013.01); *H02K 7/183* (2013.01); *F03D 13/20* (2016.05); *F03D 80/70* (2016.05); *H02K 2213/12* (2013.01); *Y02E 10/72* (2013.01)

(58) Field of Classification Search
CPC .......... H02K 1/182; H02K 1/28; F03D 80/60; F03D 9/25; F03D 80/70; F03D 13/20; F03D 3/00; Y02E 10/72
USPC .............................. 290/44, 55; 310/112–114
See application file for complete search history.

(56) References Cited

U.S. PATENT DOCUMENTS

| | | |
|---|---|---|
| 7,081,696 B2 | 7/2006 | Ritchey |
| 8,384,233 B2* | 2/2013 | Lagerweij ............... F03D 80/70 |
| | | 290/55 |
| 8,791,616 B2 | 7/2014 | Canini et al. |
| 2004/0108781 A1* | 6/2004 | Razzell .................... H02K 7/11 |
| | | 310/112 |
| 2006/0033392 A1* | 2/2006 | Ritchey .................. H02K 7/108 |
| | | 310/112 |
| 2010/0327688 A1 | 12/2010 | Canini et al. |
| 2013/0134815 A1 | 5/2013 | Powell et al. |
| 2015/0229193 A1* | 8/2015 | Chen .................... H02K 16/00 |
| | | 310/114 |
| 2015/0244221 A1 | 8/2015 | Canini |
| 2018/0041081 A1 | 2/2018 | Canini |
| 2019/0020236 A1 | 1/2019 | Canini |
| 2019/0348881 A1 | 11/2019 | Canini |

* cited by examiner

ELECTRIC GENERATOR HAVING MULTIPLE ELECTRICAL MACHINES

CROSS REFERENCE TO RELATED APPLICATIONS

This application is a continuation of U.S. Non-provisional application Ser. No. 16/996,568 filed 18 Aug. 2020 (now allowed), which is a continuation of U.S. Non-provisional application Ser. No. 16/524,218 filed 29 Jul. 2019 (abandoned), which is a continuation of U.S. Non-provisional application Ser. No. 16/134,160 filed 18 Sep. 2018 (abandoned), which is a continuation of U.S. application Ser. No. 15/787,190 filed on 18 Oct. 2017 (abandoned), which is a continuation of U.S. application Ser. No. 14/432,491 filed on 31 Mar. 2015 (abandoned), which is a U.S. National Stage application of International Application No. PCT/FR2013/052120 filed 17 Sep. 2013, which claims priority to French Application No. 1259253 filed 1 Oct. 2012, the entire disclosures of which are hereby incorporated by reference in their entireties.

BACKGROUND OF THE INVENTION

The subject of the present invention is an electric generator allowing the conversion of mechanical energy to electrical energy.

In its main application the electric generator is used for converting the mechanical energy of a wind turbine. However, the electric generator can also be used in numerous other sectors, such as electricity power stations grouped with a steam turbine or gas turbine, or in hydraulic power stations.

In the remainder of the application, the advantages are detailed of an electric generator comprising at least one electrical machine, the electrical machine being an axial flow alternator able to be integrated in a wind turbine.

On the basis of this example, persons skilled in the art will easily infer the adaptations required to produce the electric generator for other applications such as those aforementioned.

For several years, the dimensions of wind turbines and in particular the diameter of their blades have undergone considerable increase to obtain very high electric power without multiplying the number of wind turbines. Thereafter the electrical machines equipping these wind turbines have become increasingly more voluminous.

These changes to the size of electrical machines require the adapting of production tooling, complicate installation and maintenance, increase manufacturing and installation costs and accentuate the visual impact of such devices.

One solution is proposed in document FR 2 926 935 held by the applicant, which describes an electrical machine comprising a rotor surrounding a stator, the rotor and stator both being formed of different sections joined to one another. The structure of the rotor and of the stator therefore allows electrical machines to be produced of varying size, using one and the same production tooling, and being easier to install than electrical machines of same size comprising a rotor and stator each formed of a single piece.

However this solution does not solve all the problems previously mentioned amongst which the visual impact of wind turbines of large size.

SUBJECT AND SUMMARY OF THE INVENTION

It is the objective of the present invention to propose an electric generator allowing very high electrical power to be obtained without a significant increase in the dimensions of the electric generator. This objective is reached through the fact that the invention concerns an electric generator allowing the conversion of mechanical energy to electrical energy, the electric generator at least comprising:

a first axial flow electrical machine comprising a first rotor mounted in rotation about a first axis and surrounding a first stator to generate a first magnetic flow;

a second axial flow electrical machine comprising a second rotor separate from the first rotor, which is coaxial to the first rotor and surrounds a second stator to generate a second magnetic flow;

first azimuthal securing means to join the first and second rotors so that the first and second rotors can be simultaneously placed in rotation about the first axis for the simultaneous generation of the first and second magnetic flows.

This device therefore allows the accumulation of the electric powers generated by the first and second electrical machines, to obtain greater electrical energy than would be obtained by an electric generator only comprising one of the first and second electrical machines.

By azimuthal is meant the direction perpendicular both to the axial direction of the first and second rotors, defined by the first axis about which the first and second rotors are rotatably mounted, and to the radial direction of the first and second rotors, defined by one of the radii of one of the first and second rotors. Azimuthal joining has the effect that the first and second rotors cannot rotate relative to one another about their axial directions. Said otherwise, azimuthal joining of two rotors prevents relative azimuthal movement between these two rotors. The rotation of one of the rotors therefore causes the rotation of the other.

Since the first and second rotors are secured to one another, they are set in rotation simultaneously, for example but not limited thereto by the hub of a wind turbine.

In addition, the complexity of the manufacture of the electric generator of the present invention is similar to that of the manufacture of each of the first and second electrical machines; its manufacturing cost is equal to or slightly higher than the manufacturing costs of the first and second electrical machines.

Its installation and maintenance are significantly simplified compared with an electric generator generating similar electrical power and comprising a single electrical machine, the dimensions of this single electrical machine being substantially larger than those of each of the first and second electrical machines forming the generator of the present invention.

In the event of faulty functioning of one or other of the electrical machines, the electric generator of the present invention is able to continue generating electric energy, the electric generator thereby remaining available. This characteristic is particularly advantageous when the electric generator is used to equip a wind turbine installed in areas having difficult access, in open sea for example, the servicing time to repair the faulty element then possibly being particularly lengthy.

The radial bulk of the electric generator of the present invention is the same as that of an electrical machine of larger size.

By radial bulk of the generator is meant the span defined by the first and second electrical machines in a plane perpendicular to the first axis.

Preferably, the first and second rotors respectively surround the first and second stators circumferentially.

In other words, the first and second rotors extend along the respective circumference of the first and second stators, surrounding the same.

It will therefore be understood that the first and second rotors each define an annular cavity or housing configured to receive the first and second stators respectively.

The annular housings thus defined by the first and second rotors are joined together by the first azimuthal securing means.

Preferably, the first and second electrical machines are identical, so that the complexity of the manufacture of the electric generator is thereby further reduced. The radial bulk of the electric generator is then the radial bulk of an electric generator only comprising a single electrical machine.

Advantageously, the first and second electrical machines are able to implement different technologies, to reduce the probability that the electrical machines may simultaneously develop a fault.

The invention is described below in a series of variants of embodiment which can be considered alone or in combination with one or more of the others.

Advantageously, the first and second rotors each comprise first and second walls, arranged either side of the first and second stators respectively, which define a first and second annular housing respectively in which the first and second stators are housed, the second wall of the first rotor and the first wall of the second rotor being arranged facing one another and the first azimuthal securing means being configured to join together the second wall of the first rotor and the first wall of the second rotor in an azimuthal direction. Azimuthal coupling is therefore obtained between the first and second rotors.

It will therefore be understood that in the electrical machines of the electric generator of the present invention, each stator is arranged between the first and second walls of the corresponding rotor, the first and second walls of each of the rotors defining a circumferential housing. It will also be understood that the first and second electrical machines are placed side by side, and that they are secured to one another by cooperation of their adjacent walls. It is therefore understood that in a plane containing the first axis the electric generator has an axis of symmetry positioned between the second wall of the first machine and the first wall of the second machine.

With this arrangement, it is sufficient that one of the electrical machines is driven in rotation about the first axis so that it will cause the other electrical machine also to be driven in rotation about the first axis.

Additionally, with this arrangement, it will be understood that the structure of the stators need not be modified so that they can be mounted on the electric generator of the present invention, thereby avoiding the generation of additional costs for the manufacture and assembly thereof. Also, it will be understood that the first securing means are mounted on the outer surface of the adjacent walls of the first and second rotors, so that the inner structure of the rotors and the functioning of the electrical machines are not modified by the joining of the first and second electrical machines.

By outer surface of the walls is meant the surface of the rotor walls opposite the surface arranged facing the first and second stator with which the first and second rotors respectively cooperate.

Preferably the first and second walls of the first and second rotors are of annular shape.

Advantageously the first and second walls of the first and second rotors are in the shape of coaxial discs.

Preferably the first and second stators are also coaxial discs.

Advantageously the first and second stators are coaxial to the first and second rotors.

Preferably, the first azimuthal securing means also form axial securing means configured to couple together the first and second rotors along the first axis. In other words, they prevent any axial movement between the first and second rotors. The only degree of freedom is radial movement which is only permitted during mounting and dismounting operations of the electric generator of the present invention.

Advantageously, the first azimuthal securing means comprise a sliding connection enabling radial movement of the second wall of the first rotor relative to the first wall of the second rotor when assembling the electric generator.

With this arrangement, it will be understood that the first and second rotors are secured together via radial translation along an axis perpendicular to the first axis, so that the axial space required for assembling of the electric generator is equal to the axial space taken up the electric generator once it has been mounted.

By axial space is to be understood the portion of the first axis along which the first and second electrical machines are arranged in the electric generator of the present invention.

It will therefore be understood that the first azimuthal securing means are moved radially relative to the first and second rotors in order to assemble the electric generator of the present invention. The use of a sliding connection therefore ensures a maintained constant gap between the first and second rotors Preferably the sliding connection comprises an outer slide formed on one of the walls from among the second wall of the first rotor and the first wall of the second rotor, and an inner slide formed on the other of the walls from among the second wall of the first rotor and the first wall of the second rotor, the inner and outer slides being configured so that the inner slide slides in the outer slide at the time of assembling the electric generator.

It will therefore be understood that the second wall of the first rotor and the first wall of the second rotor comprise outer and inner slides formed on their outer surface so that it is possible to secure the two walls to one another. With this arrangement, the manufacturing of the rotors is identical to that of a rotor intended to equip an electric generator only comprising a single electrical machine, the inner and outer slides simply having to be added and secured onto the outer surfaces of the rotors.

Advantageously, the slide connection has a dovetail-shaped profile.

By dovetail is meant a slide connection which comprises a tenon of trapezoid shape engaging in a groove of same shape to ensure the sliding connection.

The sliding of the slides one in the other also provides for simplified mounting of the electric generator of the present invention, once the inner slide is engaged in the outer slide, the user only having to translate the slides in relation to each other.

Advantageously, one of the first and second rotors is composed of at least two sections and of assembly means allowing the joining of the two sections to each other, the first azimuthal securing means being arranged on at least one of the sections.

With this arrangement, it is possible to manufacture and transport the different sections of the rotor separately, the assembling together of the sections possibly being performed at the mounting site of the electric generator of the present invention.

Additionally, the use of sections to form the rotor also allows electrical machines of varying sizes to be produced, and in particular of large size using one same production tooling.

Preferably the two rotors are composed of at least two sections.

Advantageously, the two rotors comprise the same number of sections.

Advantageously, each section of the first rotor can be secured by azimuthal securing means to one of the sections of the second rotor.

Preferably, the electric generator also comprises attachment means to secure the first and second stators.

With this configuration, the gap between the stators is kept constant.

Advantageously, the electric generator also comprises a third axial flow electrical machine comprising a third rotor coaxial to the first rotor and surrounding a third stator to generate a third magnetic flow, and second azimuthal securing means to secure the third rotor to one of the first and second rotors so that the first, second and third rotors can be simultaneously set in rotation about the first axis to generate the first, second and third magnetic flows simultaneously.

The third rotor therefore defines a third annular housing configured to receive the third stator, the third annular housing being connected to one of the first and second annular housings by the second azimuthal securing means.

It will be understood that all the advantages detailed previously for an electric generator comprising a first and second electrical machine remain true for the case in which the electric generator comprises three electrical machines. It is within easy reach of persons skilled in the art, from the structure of the electric generators described in this application, to infer the structure of an electric generator which may comprise four, five or more electrical machines. It is therefore easily possible to have an electric generator of the desired power by associating a suitable number of electrical machines.

The invention also concerns a wind turbine comprising a tower and hub mounted in rotation relative to the tower about an axis of rotation, the hub being driven in rotation by a spinner, the wind turbine also comprising an electric generator according to the present invention, the first and second rotors being mounted in rotation about the axis of rotation.

Advantageously, at least one of the first and second rotors comprises securing means configured to secure the said at least one of the first and second rotors to the hub.

With this configuration it will be understood that the spinner, via the securing means, drives the first and rotors in rotation. Therefore the electric power produced by the wind turbine of the present invention, obtained by combining the first and second electrical machines, is substantially higher than the power that would be produced by a wind turbine of same size of which the electric generator only comprises one of the first and second electrical machines.

Preferably the wind turbine comprises a flange connecting the hub to at least one of the electrical machines, perforations being made in the flange to allow ventilation of the electrical machines.

Advantageously, the wind turbine comprises a ventilation system comprising at least one ventilation module formed of a fan and motor.

Preferably, the ventilation system comprises at least as many ventilation modules as there are electrical machines.

With this configuration, it will be understood that each of the ventilation modules is intended to ventilate separately one of the electrical machines. The configuration of the ventilation system therefore allows some ventilation modules to be placed in operation selectively to ventilate at least one of the electrical machines.

Advantageously, each electrical machine comprises a power converter configured to transfer the electric power generated by the electrical machines onto the electricity grid allowing the conveying of electric energy to consumers.

Advantageously, the wind turbine of the present invention comprises a selection system configured to set in operation independently each of the power converters of the electric generator.

It will therefore be understood that it is possible to optimise the yield of the electric generator, for example when wind power is low, by only setting in operation some power converters. The selection system also allows the production time of electric energy to be distributed over the different electric machines so as to manage the wear thereof.

More generally it will be understood that the electric generator of the present invention comprises numerous modular factors: several electrical machines can be combined with one another within one same electric generator, the different electrical machines can be of same or different size and power or have same or different properties, or they can apply same or different technologies, the rotors can be composed of several sections, the stators can also be composed of several separate parts intended to be assembled, the ventilation system comprises several ventilation modules, each electrical machine is associated with a separate power converter, . . . .

It will therefore be understood that starting from elementary components such as the rotor sections, stator elements, ventilation modules, power converters, . . . , it is possible to produce a wind turbine which meets all types of power and size requirements. As detailed in the foregoing when describing the electric generator comprising first and second electrical machines, said modular structure has multiple advantages regarding cost and complexity of manufacture, the transport of components of the wind turbine to the assembly site, the dimensions of the assembled wind turbine, the maintenance thereof, its capacity to generate electric energy continuously, despite unfavourable outside conditions or faulty elements, . . . .

In addition, the invention also concerns a method for mounting a wind turbine according to the present invention, the wind turbine comprising a first and second electrical machine, the method comprising a step during which the first electrical machine is mounted on the wind turbine, followed by a step during which the second stator is mounted on the wind turbine, followed by a step during which the second rotor is mounted around the second stator and is secured to the first rotor.

Advantageously, it is therefore possible to replace one of the constituent elements of one of the first and second machines without dismounting the assembly formed by the first and second electrical machines.

Advantageously, the first and second electrical machines can be mounted together in accordance with the method, before the assembly formed by the first and second electrical machines is mounted on the wind turbine, for example to carry out testing thereof.

Finally, the invention concerns a method for assembling a wind turbine of the present invention, the wind turbine comprising a first, a second and a third electrical machine, the method comprising a step during which the first electrical machine is mounted on the wind turbine, followed by a step during which the second stator is mounted on the wind turbine, followed by a step during which the third electrical machine is mounted on the wind turbine, followed by a step during which the second rotor is mounted around the second stator and is secured to the first and third rotors.

Advantageously the first, second and third electrical machines can be mounted together according to the method before the assembly formed by the three electrical machines is mounted on the wind turbine.

BRIEF DESCRIPTION OF THE DRAWINGS

Other characteristics and advantages of the invention will become more clearly apparent and complete on reading the following description of one preferred embodiment given as a non-limiting example and with reference to the appended drawings in which.

DETAILED DESCRIPTION OF THE INVENTION

Figure 1:
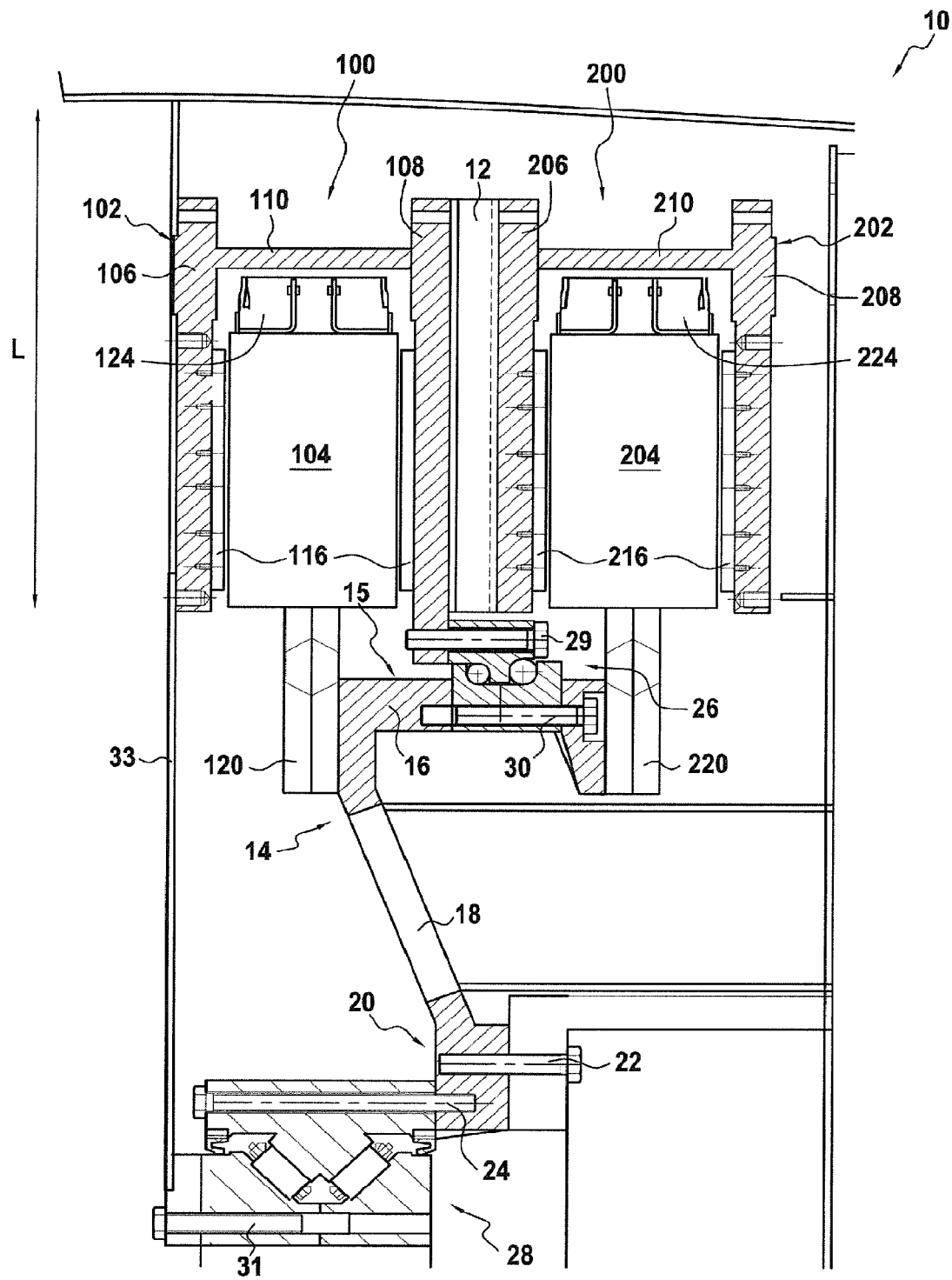
FIG. 1 schematically illustrates an example of an electric generator according to the present invention, the electric generator comprising a first and second electrical machine.

In the example illustrated in FIG. 1, the electric generator 10 of the invention has a first axial flow electrical machine 100 formed by a first rotor 102 mounted in rotation about a first axis X and surrounding a first stator 104. The electric generator 10 also has a second axial flow electrical machine 200 formed by a second rotor 202 also mounted in rotation about a first axis X and surrounding a second stator 204.

As illustrated in FIG. 1, the first rotor 102 has a U-shaped profile, but is not limited thereto; the first rotor 102 particularly comprises first 106 and second 108 walls arranged either side of the first stator 104. The first rotor 102 further comprises a first upper edge 110 which connects the first 106 and second 108 walls.

The first 106 and second 108 walls of the first rotor 102 each have an annular shape and define a first annular housing configured to receive the first stator 104.

It will therefore be understood that the first rotor 102 surrounds the first stator 104 circumferentially. In other words, the first rotor 102 extends along the circumference of the first stator 104 so as to surround the latter.

Similarly the second rotor 202 has a U-shaped profile but is not limited thereto; the second rotor 202 in particular comprises first 206 and second 208 walls arranged either side of the second stator 204 and connected by a second upper edge 210.

Therefore, in similar manner to the first electrical machine 100, the first 206 and second 208 walls of the second rotor 202 are each of annular shape, and define a second annular housing configured to receive the second stator 204.

In other words, second rotor 202 surrounds the second stator 204 circumferentially.

Without departing from the scope of the present invention, the first and second walls 106, 108, 206, 208 and the upper edges 110, 210 of each of the first and second rotors 102, 202 could form a single part having a profile such that it surrounds the first 104 and second 204 stators respectively.

The electric generator 10 of the present invention also comprises first securing means 12 arranged between the second wall 108 of the first electrical machine 100 and the first wall 206 of the second electrical machine 200, which will be described in more detail in particular in the description of FIG. 2.

It will be understood that the first securing means 12 are configured to join the first and second circumferential housings defined by the first 102 and second 202 rotors respectively.

The electric generator 10 also comprises first connecting means 14 arranged between the first 100 and second 200 electrical machines. As illustrated in FIG. 1, the upper end 15 of the first connecting means 14 is arranged between the first 104 and second 204 stators and comprises attaching means 16 configured to secure the first 104 and second 204 stators.

The median portion of the first connecting means 14 comprises a perforation 18, and the lower portion thereof 20 comprises first 22 and second 24 attaching elements.

As illustrated in FIG. 1, the electric generator 10 also comprises first 26 and second 28 bearings. The upper portion of the first bearing 26 is secured to the second wall 108 of the first rotor 102 of the first electrical machine 100 via first securing means 29; the lower portion of the first bearing 26 is secured to the upper end 15 of the first connecting means 14 via second securing means 30.

The upper portion of the second bearing 28 is secured to the lower end 20 of the first connecting means 14 via second attaching elements 24; the lower portion of the second bearing 28 comprises coupling means 31.

As illustrated in the different Figures, the first and second 29, 30 securing means, the first and second 22, 24 attaching elements and the coupling means 31 can be formed of bolts; they may also be formed of any other means allowing the securing together of several elements without departing from the scope of the invention.

Finally, the electric generator 10 comprises attaching means 33 mounted both on the first wall 106 of the first rotor 102 of the first electrical machine 100 and on the second bearing 28 via coupling means 31.

Figure 2:
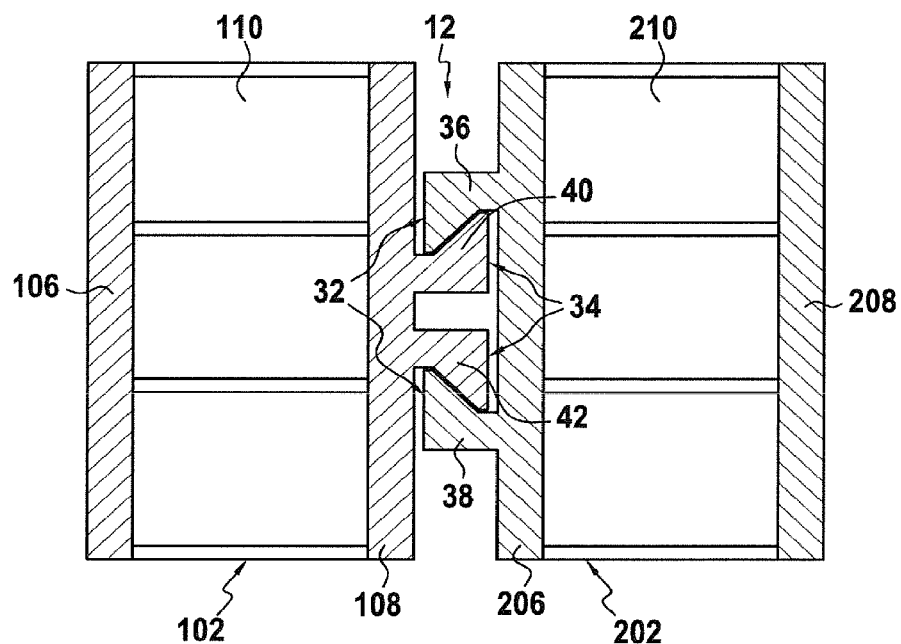
FIG. 2 schematically illustrates the first and second electrical machines of the electric generator in FIG. 1, seen from overhead.

FIG. 2 gives a detailed illustration of the first azimuthal securing means 12.

In this Figure in which the first 102 and second 202 rotors are illustrated from above, it can be seen that the first azimuthal securing means 12 are formed of an outer slide 32 and inner slide 34.

The outer slide 32 is formed by first 36 and second 38 lateral portions, both formed on the first wall 206 of the second rotor 202. The space formed between the first 36 and second 38 lateral portions defines a housing having a trapezoid-shaped profile.

The inner slide 34 is formed by a first 40 and second 42 side, both formed on the second wall 108 of the first rotor 102 and which define a section of trapezoid shape configured to be contained in the housing defined by the outer slide 32. The inner slide 34 could also be formed of a single part defining a section of trapezoid shape without departing from the scope of the invention. It will therefore be understood that the shape of the inner 34 and outer 32 slides is such that the inner slide 34 is able to slide in the outer slide 32 in longitudinal direction L, the longitudinal direction L being defined by the lateral portions 36, 38 and the sides 40, 42 parallel to one another.

As can be seen in FIG. 2, the lateral portions 36, 38 and the sides 40, 42 project from the first wall 206 of the second rotor 202 and the second wall 108 of the first rotor 102 respectively; for example but not limited thereto the lateral portions 36, 38 and the sides 40, 42 are secured by screwing or any other securing device onto the first wall 206 of the second rotor 202 and onto the second wall 108 of the first rotor 102.

It can therefore be seen that the first azimuthal securing means 12 have a dovetail-shaped profile.

It could also be contemplated, without departing from the scope of the present invention, that the first azimuthal securing means 12 could have a profile of different shape, or that the electric generator 10 could have an inner slide 34 and outer slide 32 respectively formed on the first wall 206 of the second rotor 202 and on the second wall 108 of the first rotor 102.

It will therefore be understood that the first azimuthal securing means 12 comprise a slide connection in a longitudinal direction L, which forms a radial direction of the first 102 and second 202 rotors, the slide connection being formed by the inner slide 34 and outer slide 32 configured to slide in one another when mounting the electric generator 10 of the present invention, so as to secure the first 102 and second 202 rotors.

Figure 3:
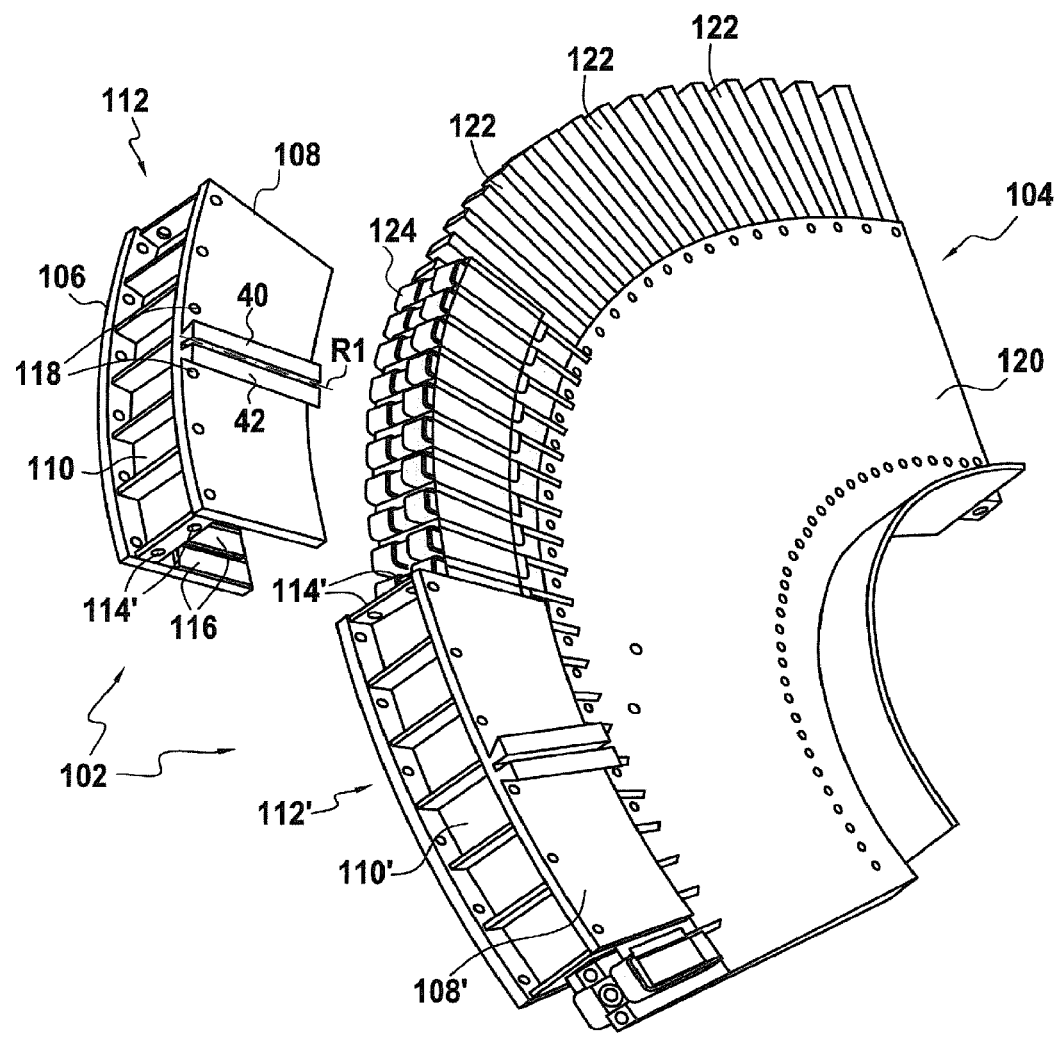
FIG. 3 schematically illustrates part of the first and second electrical machines of the electric generator in FIG. 1.
Figure 4:
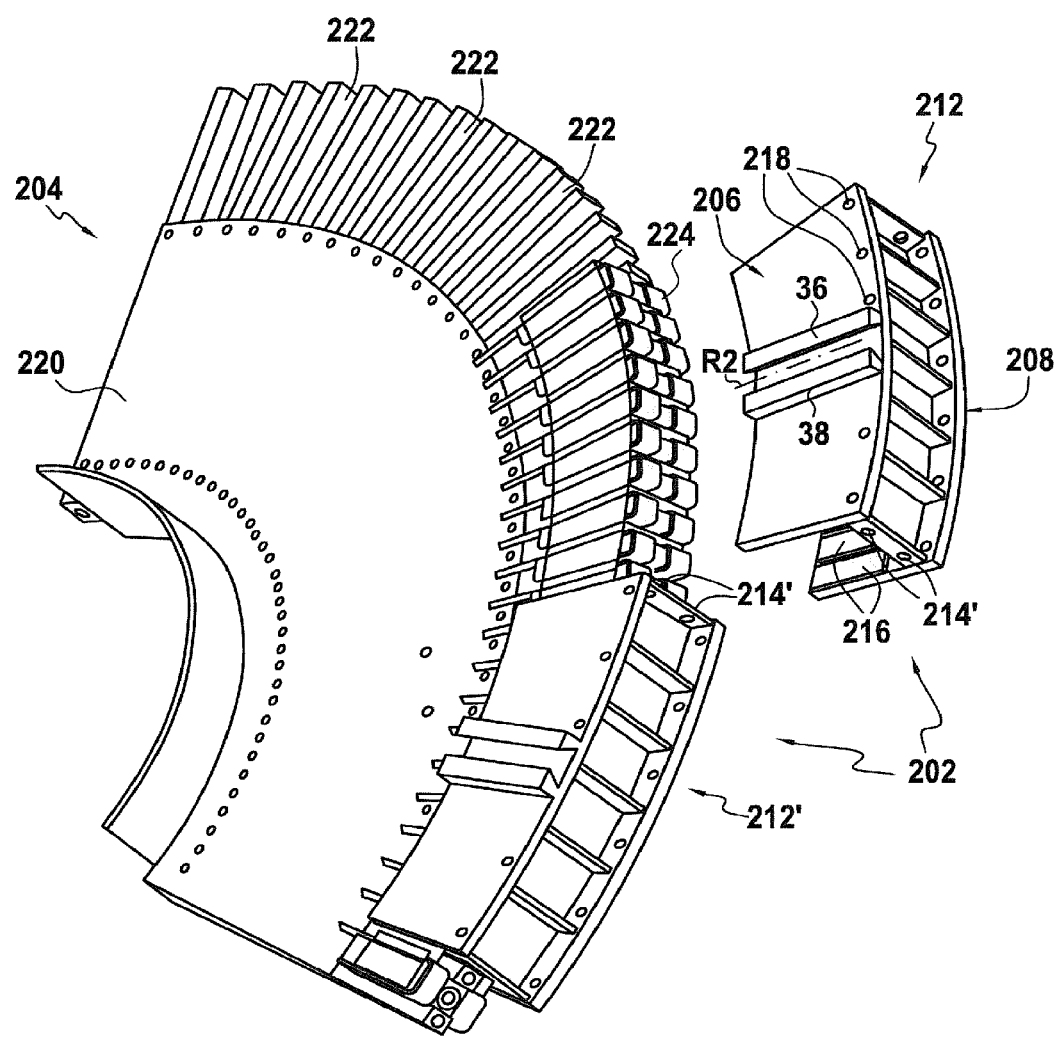
FIG. 4 schematically illustrates part of the first and second electrical machines of the electric generator in FIG. 1.

FIGS. 3 and 4 illustrate part of the first 100 and second 200 electrical machine of the electric generator 10 of the present invention.

As illustrated in FIG. 3, the first rotor 102 is formed of several sections 112, 112' which comprise assembly orifices 114, 114' formed on the upper edges 110, 110' for assembling of the sections 112, 112', via assembly means such as screws, but not limited thereto, passed through the assembly orifices 114, 114'. Any other assembly means could also be envisaged without departing from the scope of the present invention.

The first and second walls 106, 108 of the first rotor 102 each define an inner surface and outer surface, the inner surfaces of the first and second walls 106, 108 being arranged facing one another and surrounding the first stator 104. As illustrated in FIG. 3, magnetizing areas 116 are arranged on the inner surfaces of the walls 106, 108, these magnetizing areas 116 forming the inductor portion of the magnetic circuit of the first electrical machine 100.

For example, but not limited thereto, the magnetizing areas 116 are formed by the superimposition of permanent magnets. It could also be envisaged without departing from the scope of the present invention, that the inductor portion of the magnetic circuit of the first electrical machine 100 is formed of any other element such as coils for example.

As illustrated in FIG. 3, the first 40 and second 42 sides of the inner slide 34 are formed on the outer surface of the second wall 108. Also, first matching means 118 are arranged on the outer surface of the second wall 108.

The first stator 104 is formed by a first rim of which one portion 120 is illustrated in FIG. 3; the portion 120 comprises radial notches 122 in which first active modules are inserted 124.

The first active modules 124 form the induced part of the magnetic circuit of the first electrical machine 100.

It will therefore be understood from FIG. 3, that the first rim of the first stator 104 is advantageously formed of at least two portions 120, the portions 120 able to be easily assembled at the mounting site of the electric generator 10 using conventional operations for those skilled in the art such as welding or riveting for example.

It will also be understood that the shape of the sections 112, 112' of the first rotor 102 makes it possible easily and precisely to position the inducing part in relation to the induced part of the first stator 104.

Finally it will be understood that the assembling of the portions 120 of the first rim of the first stator 104 defines a disc the centre of which has an orifice for mounting of the first stator 104 in free rotation. The assembling of the sections 112, 112' of the first rotor 102 defines a cylinder portion having an outer diameter of same or even slightly larger size than the disc formed by the first stator 104, the cylinder portion formed by the first rotor 102 comprising two lateral edges arranged perpendicular to the cylinder surface and configured to be arranged either side of the radial end of the disc formed by the first stator 104.

Similarly, and as illustrated in FIG. 4, the second rotor 202 is formed of several sections 212, 212' comprising assembly orifices 214, 214'. The first and second walls 206, 208 each comprise an inner surface and an outer surface, magnetization areas 216 being arranged on the inner surfaces of the walls 206, 208.

As illustrated in FIG. 4, the first 36 and second 38 lateral portions of the outer slide 32 are formed on the outer surface of the first wall 206. In addition, second matching means 218 are arranged on the outer surface of the first wall 206.

The second stator 204 is formed of a second rim, of which one portion 220 is illustrated in FIG. 4; the portion 220 comprises second radial notches 222 in which second active modules 224 are inserted.

It will be understood from FIGS. 3 and 4 that the sides 40, 42 and the lateral portions 36, 38 are respectively arranged symmetrically in relation to a first R1 and second R2 radius of the first 102 and second 202 rotors.

Figure 5:
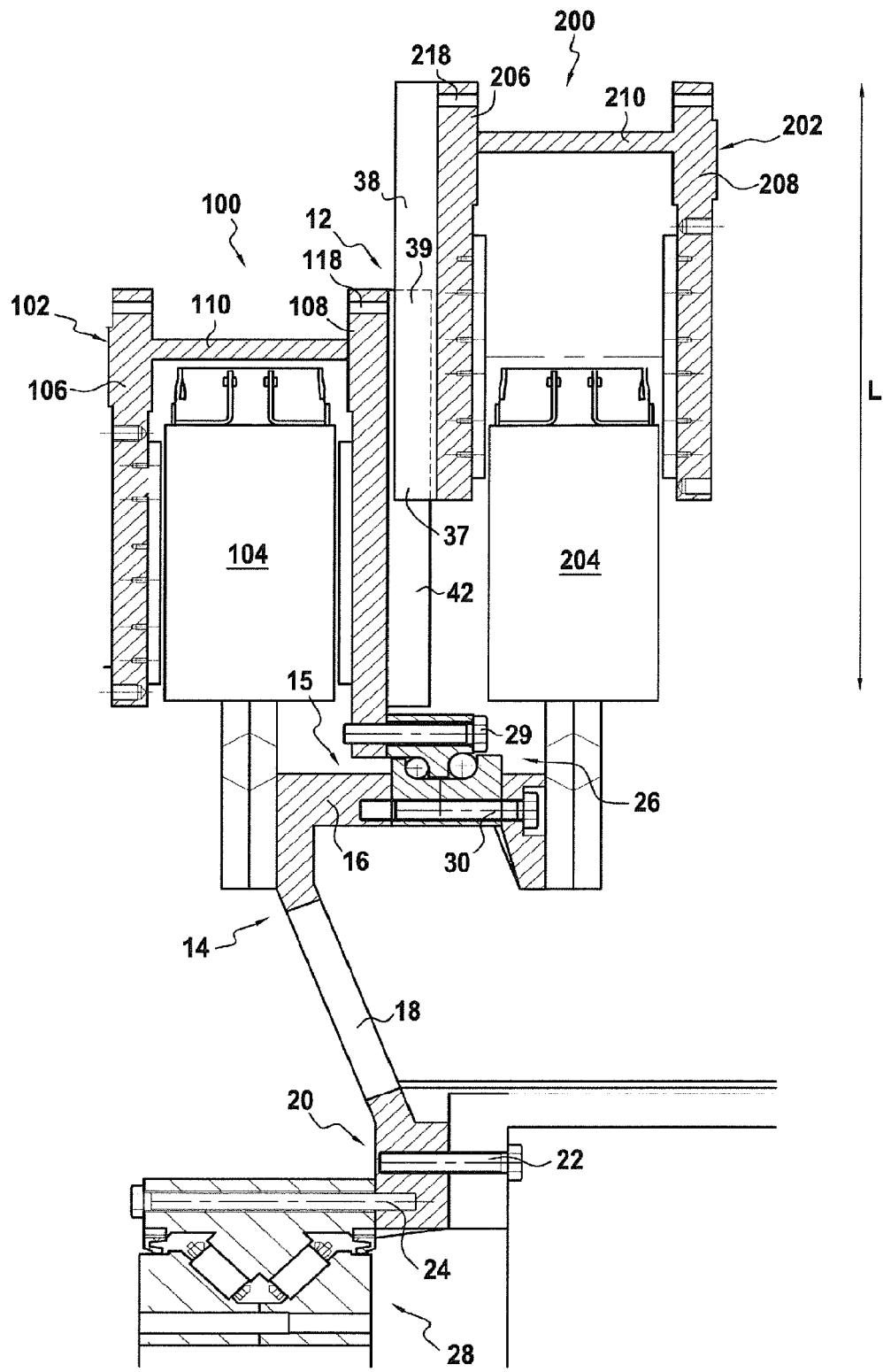
FIG. 5 schematically illustrates a step in the mounting of the electric generator in FIG. 1.

FIG. 5 illustrates a mounting step of the electric generator 10.

Initially the first connecting means 14 are mounted on the second bearing 28, via cooperation between second attaching elements 24 and the upper part of the second bearing 28.

The portions 120 of the first rim of the first stator 104 are then mounted on the upper end 15 of the first connecting means 14, and the first bearing 26 is also mounted, for example but not limited thereto by welding or riveting, on the upper end 15 of the first connecting means 14.

As detailed previously in connection with FIG. 3, the sections 112, 112' of the first rotor 102 are then mounted around the first stator 104, the sections 112, 112' being secured via their assembly orifices 114, 114' and assembly means, and the radial engaging of the sections 112, 112' around the first stator 104 is limited by the presence of the first bearing 26; in particular, the first securing means 29 allow the securing together of the second wall 108 of the first rotor 102 and the first bearing 26.

Next, the portions 220 of the second rim of the second stator 204 are mounted on the attaching means 16 of the upper end 15 of the connecting means 14. In particular, the attaching means 16 define a first and second longitudinal end, the first and second stators 104, 204 being respectively mounted on each of the longitudinal ends, the first bearing 26 being mounted between the two longitudinal ends.

Thereafter and as illustrated in FIG. 5, the sections 212, 212' of the second rotor 202 are moved radially relative to the sections 112, 112' of the first rotor 102.

For example, but not limited thereto, the first and second rotors 102, 202 each comprise the same number of sections, each section 112, 112', 212, 212' comprising first azimuthal securing means 12 and each section 112, 112' of the first rotor 102 being configured to cooperate with a section 212, 212' of the second rotor 202.

It could also be contemplated, without departing from the scope of the invention, that the first 102 and second 202 rotors do not comprise the same number of sections or that the matching of the sections of the first and second rotors 102, 202 is only performed by some of their sections.

It will therefore be understood, as illustrated in particular in FIG. 5, that the section 220 of the second rotor 202 is arranged above the second stator 204, the first and second walls 206, 208 being arranged on each side of the second stator 204, and the first wall 206 of the second rotor 202 is arranged facing the second wall 108 of the first rotor 102, the lower end 37 of the outer slide 32 formed on the second rotor 202 being arranged opposite, even slightly above the upper end 39 of the inner slide 34 formed on the first rotor 102. The second rotor 202 can then be moved radially relative to the first rotor 102, when mounting or dismounting the electric generator 10, so that the outer slide 32 slides around the inner slide 34. In this position in which the outer 32 and inner 34 slides cooperate, there is merging of the first R1 and second R2 radii.

The second rotor 202 is therefore moved radially in relation to the first rotor 102 until the first 118 and second 218 matching means are arranged opposite one another to match the first 102 and second 202 rotors. For example and not limited thereto, the matching means 118, 218 can be formed by threaded holes and bolts, rivets or any other device allowing the matching of the first and second 102, 202 rotors. It could also be envisaged, without departing from the scope of the present invention, that there is an abutment on the first azimuthal securing means 12 allowing the limiting of radial movement of the second wall 108 of the first rotor 102 relative to the first wall 206 of the second rotor 202.

It will therefore be understood that the first azimuthal securing means 12 have the effect that the first 102 and second 202 rotors are unable to rotate in relation to one another about the first axis X.

It will also be understood that the shape of the first azimuthal securing means 12, described in particular with reference to FIG. 2, is such that the first azimuthal securing means 12 prevent any axial movement relative to the first axis X between the first 102 and second 202 rotors, thereby making it possible to maintain constant the distance separating the first 102 and second 202 rotors. It therefore appears that the first azimuthal securing means 12 also form axial securing means.

Without departing from the scope of the present invention, an electric generator 10 can also be envisaged of which the second rotor 202 is secured onto the first bearing 26, the second rotor 202 therefore not necessarily comprising matching means to allow the second rotor 202 to be matched directly with the first rotor 102.

Figure 6:
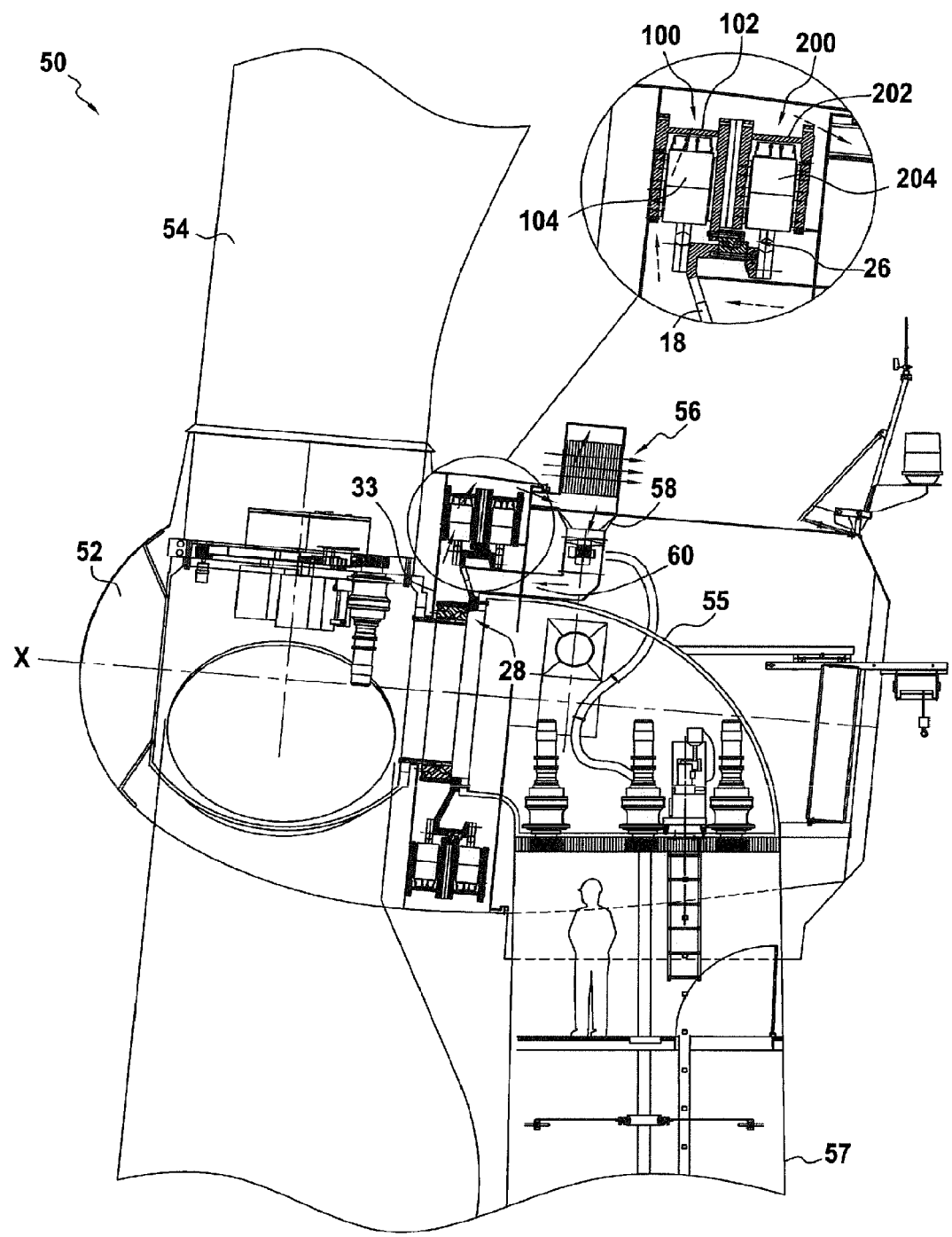
FIG. 6 schematically illustrates a wind turbine comprising the electric generator in FIG. 1.

FIG. 6 illustrates a wind turbine 50 comprising a hub 52 mounted in rotation about the first axis X, and a spinner 54 to drive the hub 52 in rotation about the first axis X; also, the first 100 and second 200 electrical machines are mounted in the wind turbine 50. As illustrated in FIG. 6, the first and second stators 104, 204 and the first and second rotors 102, 202 are coaxial to one another, the first and second 102, 202 rotors both being mounted in rotation about the first axis X.

The attaching means 33 mounted on the first wall 106 of the first rotor 102 are also mounted on the hub 52. It will therefore be understood that when the spinner 54 drives the hub 52 in rotation about the first axis X, it also drives the first rotor 102 in rotation about the first axis X, via the attaching means 33. Subsequently, since the first and second rotors 102, 202 are secured by the first azimuthal securing means 12, the second rotor 202 is simultaneously driven in rotation about the first axis X.

For example but not limited thereto the attaching means 33 are formed of a plate or metal sheet of which the lower end is attached to the hub 52 and to the second bearing 28, for example by clamping the lower end of the metal sheet between the hub 52 and the second bearing 28.

As can be seen on examining FIG. 6, the wind turbine 50 is also formed of a frame 55 secured to a tower 57 on which the hub 52 is mounted in rotation. The first and second stators 104, 204 are mounted firstly on the frame 55 of the wind turbine via first attaching elements 22 mounted on the lower end 20 of the first connecting means 14, and secondly on the first and second bearings 26, 28; they are not driven in rotation about the axis X. Therefore via respective cooperation between the induced part of the first and second stators 104, 204 stators and the inducing part of the first and second rotors 102, 202, the first and second electrical machines 100, 200 respectively generate first and second magnetic flows.

As illustrated in FIG. 6, the wind turbine 50 also comprises a ventilation system 56 which comprises at least one ventilation module 58 formed of a fan and motor. The ventilation system 56 also comprises an aeration duct 60 directed towards the perforation 18 formed in the median portion of the first connecting means 14.

Therefore and as shown by the arrows illustrating the cycle in FIG. 6, the ventilation system 56 allows the diffusing of a fluid e.g. air of temperature T1 in the first and second electrical machines 100, 200. The operation of the first and second electrical machines 100, 200 and in particular the rotation of the first 102 and second 202 rotors, tends to raise the temperature of the fluid which is then directed at temperature T2, towards the ventilation system 56. Through heat exchange with the environment outside the wind turbine 50, the temperature of the fluid is lowered to temperature T1, before the fluid is again directed into the aeration duct 60 towards the first and second electrical machines 100, 200.

As detailed in particular with reference to FIGS. 3 and 4, the first 100 and second 200 electrical machines have a modular structure and in particular comprise several sections 112, 112', 212, 212' forming the first 102 and second 202 rotors, and several portions 120, 220 forming the rims of the first 104 and second 204 stators. The first connecting means 14 subsequently define a circular shape coaxial with the stators 104, 204 and may also, but not limited thereto, be formed of a plurality of elements arranged between the first 100 and second 200 electrical machines. It will also be understood that the perforations 18 formed in the median part of the first connecting means 14 are not necessarily distributed homogeneously over the entire circular shape defined by the first connecting means 14. For example and not limited thereto, at some positions of the circular shape defined by the first connecting means 14, the median portion may not be perforated. Therefore the ventilation system 56 allows the ventilation of the first 100 and second 200 electrical machines, the perforations 18 formed in the first connecting means 14 directing the fluid towards the first machine 100, whereas the positions of the circular shape defined by the first connecting means 14 in which no perforation is formed direct the fluid towards the second electrical machine 200.

In addition, the ventilation system 56 may be formed of several ventilation modules 58. For example and not limited thereto, to allow homogenous ventilation of the electrical machines 100, 200, the same number of ventilation modules 58 may be intended for the ventilation of the first 100 and second 200 electrical machines.

It will therefore be understood that the first connecting means 14 indirectly connect the hub 52 to the first and second electrical machines, 100, 200 and form a flange in which perforations 18 are made to allow ventilation of the electrical machines 100, 200.

As detailed in the foregoing, the first and second rotors 102, 202 and the first and second stators 104, 204 are respectively formed of permanent magnets arranged around active modules. It will also be understood that the structure of the first and second electrical machines 100, 200 of the present invention is identical. Nevertheless, it could just as well be envisaged without departing from the scope of the invention that in the electric generator 10 either one of the first and second electrical machines 100, 200, or both, has induced and inducing parts of different structure; for example and not limited thereto one of the electrical machines 100, 200 could comprise a coiled rotor.

Figure 7:
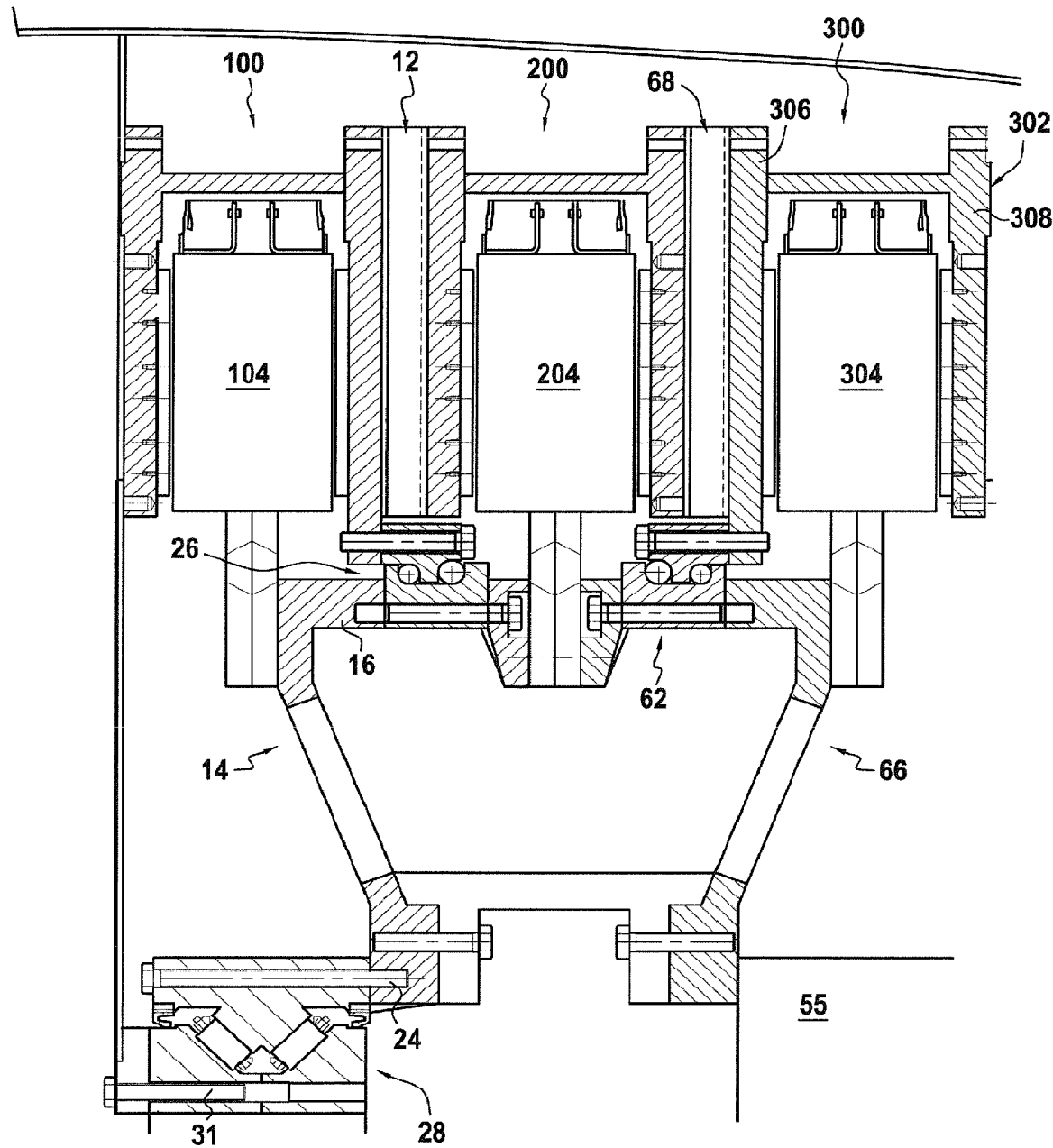
FIG. 7 schematically illustrates an example of an electric generator according to the invention, the electric generator comprising a first, a second and a third electrical machine.

FIG. 7 illustrates another embodiment of the electric generator 10 according to the present invention which, in addition to the first and second electrical machines 100, 200, comprises a third electrical machine 300 formed by a third rotor 302 coaxial to the first rotor 102 and surrounding a third stator 304. In addition, the electric generator 10 also comprises a third bearing 62 and second connecting means 66.

Similar to the first 100 and second 200 electrical machines previously described, the third rotor 302 of the third electrical machine 300 comprises first 306 and second 308 walls both of annular shape, which define a third annular housing configured to receive the third stator 304. The third stator 304 is therefore surrounded by the third rotor 302 circumferentially.

As illustrated in FIG. 7, the first 100 and third 300 electrical machines are arranged symmetrically either side of the second electrical machine 200.

It will be understood that to mount the electric generator 10 such as illustrated in FIG. 7, in similar manner to the mounting previously described, the first electrical machine 100 and the second stator 204 are mounted on the first connecting means 14. The second connecting means 66 are then mounted on the second stator 204, the lower end of the second connecting means 66 being attached to the frame 55. The third electrical machine 300 is then mounted on the second connecting means 66, the first wall 306 of the third rotor 302 being mounted on the third bearing 62, whilst the third stator 304 is mounted on the upper end of the second connecting means 66.

The second rotor 202 is then engaged between the first 100 and third 300 electrical machine, second azimuthal securing means 68 being formed on the second wall 208 of the second electrical machine 200 and on the first wall 306 of the third electrical machine 300.

It will therefore be understood that the second azimuthal securing means 68 are configured to join together the second and third annular housings defined by the second 202 and third 302 rotors respectively.

Therefore, and in similar manner to the foregoing description with reference in particular to FIG. 6, the spinner 54 drives the hub 52 in rotation about a first axis X, so that the first rotor 102 rotor is driven in rotation about the first axis X via attaching means 33. Subsequently, the second 202 and third 302 rotors being secured to the first rotor 102 by the first 12 and second 68 azimuthal securing means, they are simultaneously driven in rotation about the first axis X. Since the first 104, second 204 and third 304 stators are not driven in rotation about the first axis X, through respective cooperation between the induced part of the first, second and third stators 104, 204, 304 and the inducing part of the first, second and third rotors 102, 202, 302, the first, second and third electrical machines 100, 200, 300 machines respectively generate a first, second and third magnetic flow.

The foregoing detailed characteristics regarding the structure of the first and second electrical machines 100, 200 evidently apply to the third electrical machine 300. In particular, perforations can be made in the second connecting means 66 to enable the ventilation system 56 to ventilate the first, second and third electrical machines 100, 200, 300.

The entire foregoing description is given as an example and therefore does not limit the invention.

In particular, although the invention is particularly detailed for electric generators comprising two or three electrical machines, it can be extended directly and obviously to a higher number of electrical machines.

What is claimed is:

1. An electric generator allowing the conversion of mechanical energy to electrical energy, comprising at least:
   a first axial flow electrical machine comprising a first rotor mounted in rotation about a first axis and surrounding a first stator to generate a first magnetic flow;
   a second axial flow electrical machine comprising a second rotor separate from the first rotor, which is coaxial to the first rotor and surrounds a second stator to generate a second magnetic flow; and
   first azimuthal securing means to secure the first and second rotors so that the first and second rotors can be simultaneously set in rotation about the first axis to generate the first and second magnetic flows simultaneously.

2. The electric generator according to claim 1, wherein the first azimuthal securing means also form axial securing means to secure together the first and second rotors along the first axis.

3. The electric generator according to claim 1, wherein the first and second rotors each comprise first and second walls arranged on either side of the first and second stators respectively, so as to respectively define a first annular housing and a second annular housing configured to receive the first and second stators respectively, the second wall of the first rotor and the first wall of the second rotor being arranged facing one another and the first azimuthal securing means being configured to join together the second wall of the first rotor and the first wall of the second rotor in an azimuthal direction.

4. The electric generator according to claim 3, wherein the first azimuthal securing means comprise a slide connection configured to allow radial movement of the second wall of the first rotor relative to the first wall of the second rotor when assembling the electric generator.

5. The electric generator according to claim 4, wherein the slide connection comprises an outer slide formed on one of the walls from among the second wall of the first rotor and the first wall of the second rotor, and an inner slide formed on the other of the walls from among the second wall of the first rotor and the first wall of the second rotor, the inner and outer slides being configured so that the inner slide slides in the outer slide when assembling the electric generator.

6. The electric generator according to claim 5, wherein the slide connection has a dovetail-shaped profile.

7. The electric generator according to claim 1, wherein one of the first and second rotors is composed of at least two sections and of assembly means allowing the assembling together of the two sections, the first azimuthal securing means being arranged on at least one of the sections.

8. The electric generator according to claim 1, further comprising: attaching means to secure the first and second stators.

9. The electric generator according to claim 1, further comprising: a third axial flow electrical machine comprising a third rotor coaxial to the first rotor and surrounding a third stator to generate a third magnetic flow, the electric generator further comprising second azimuthal securing means to secure the third rotor to one of the first and second rotors so that the first, second and third rotors can be simultaneously set in rotation about the first axis to generate the first, second and third magnetic flows simultaneously.

10. A wind turbine comprising a tower and a hub mounted in rotation relative to the tower about an axis of rotation, the hub being driven in rotation by a spinner, wherein the wind turbine also comprises an electric generator according to claim 1, the first and second rotors being mounted in rotation about the axis of rotation.

11. The wind turbine according to claim 10, wherein at least one of the first and second rotors comprises attaching means configured to attach at least one of the first and second rotors to the hub.

12. The wind turbine according to claim 10, further comprising: a flange connecting the hub to at least one of the electrical machines, perforations being made in the flange to allow the ventilation of the at least one of the electrical machines.

\* \* \* \* \*